US008186835B2

(12) United States Patent
Furui

(10) Patent No.: US 8,186,835 B2
(45) Date of Patent: May 29, 2012

(54) METHOD OF MEASURING ZOOM RATIO OF PROJECTION OPTICAL SYSTEM, METHOD OF CORRECTING PROJECTION IMAGE USING THE METHOD, AND PROJECTOR EXECUTING THE CORRECTION METHOD

(75) Inventor: Shiki Furui, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 278 days.

(21) Appl. No.: 12/605,634

(22) Filed: Oct. 26, 2009

(65) Prior Publication Data
US 2010/0123878 A1 May 20, 2010

(30) Foreign Application Priority Data

Nov. 17, 2008 (JP) ................................ 2008-293212

(51) Int. Cl.
G03B 21/14 (2006.01)
G03B 13/00 (2006.01)

(52) U.S. Cl. .......................................... 353/70; 348/347

(58) Field of Classification Search .................. 353/30, 353/31, 69, 70, 100, 101, 121; 250/201.2, 250/201.4, 201.6, 201.7; 348/745, 347; 382/103, 382/287
See application file for complete search history.

(56) References Cited

U.S. PATENT DOCUMENTS

| 6,416,186 | B1 | 7/2002 | Nakamura |
| 7,226,173 | B2* | 6/2007 | Aoyanagi ..................... 353/101 |
| 2010/0110387 | A1* | 5/2010 | Wendt ............................. 353/29 |

FOREIGN PATENT DOCUMENTS

| JP | A-2001-61121 | 3/2001 |
| JP | A-2001-320652 | 11/2001 |
| JP | A-2004-140845 | 5/2004 |

* cited by examiner

Primary Examiner — Georgia Y Epps
Assistant Examiner — Don Williams
(74) Attorney, Agent, or Firm — Oliff & Berridge, PLC

(57) ABSTRACT

A method of measuring a zoom ratio of a projection optical system adapted to project image light representing an original image on a projection screen, the method includes: (a) projecting and displaying a measuring image including a measurement point on the projection screen so that the measurement point is displayed at a position with an offset from an optical axis of the projection optical system; (b) detecting a projected measurement point, which is the measurement point projected and displayed on the projection screen, from a measurement point detection position having a fixed position relative to the projection optical system; and (c) determining the zoom ratio using position information of the detected projected measurement point and correspondence between the position information and the zoom ratio, the correspondence being prepared previously.

9 Claims, 10 Drawing Sheets

ZOOM RATIO: MINIMUM

ZOOM RATIO: MAXIMUM

METHOD OF MEASURING ZOOM RATIO OF PROJECTION OPTICAL SYSTEM, METHOD OF CORRECTING PROJECTION IMAGE USING THE METHOD, AND PROJECTOR EXECUTING THE CORRECTION METHOD

BACKGROUND

1. Technical Field

The present invention relates to a projection optical system for projecting light on a projection surface while zooming the light.

2. Related Art

In a projector, image light representing an original image displayed on a liquid crystal panel is projected on a projection screen via a projection optical system, thereby displaying the image. However, the projection image of the projector might have distortion such as keystone distortion caused depending on conditions (e.g., the position or the tilt angle of the projection screen with respect to the projection optical system, and the shape of the surface of the projection screen) of the projection screen. In the past, there have been proposed various kinds of technologies for reducing the distortion of the projection image by executing a correction process on the original image in accordance with the conditions of the projection screen (e.g., JP-A-2001-061121, JP-A-2001-320652, and JP-A-2004-140845).

Incidentally, the projection optical system used in the projector is generally provided with a zoom mechanism, and is capable of displaying the projection image while arbitrarily zooming the projection image. However, when controlling the zoom ratio by the zoom mechanism, the focal distance of the projection optical system varies. Therefore, in the case in which the focal distance of the projection optical system is used as an internal parameter of the projection optical system in the correction process of the original image described above, it is preferable that the focal distance of the projection optical system thus varied after the zoom ratio has been controlled is measured more accurately. Such a demand exists not only in projectors, but also in common in optical equipment provided with the projection optical system having zoom function. However, in actual situations, sufficient devices have not ever been made with respect to such a demand.

SUMMARY

The invention has an advantage of providing a technology of improving measurement accuracy of the zoom ratio in a projection optical system having a zoom function.

The invention also has an advantage of solving at least a part of the problem described above, and can be realized as following embodiments and aspects.

According to a first aspect of the invention, there is provided a method of measuring a zoom ratio of a projection optical system adapted to project image light representing an original image on a projection screen, the method including (a) projecting and displaying a measuring image including a measurement point on the projection screen so that the measurement point is displayed at a position with an offset from an optical axis of the projection optical system, (b) detecting a projected measurement point, which is the measurement point projected and displayed on the projection screen, from a measurement point detection position having a fixed position relative to the projection optical system, and (c) determining the zoom ratio using position information of the detected projected measurement point and correspondence between the position information and the zoom ratio, the correspondence being prepared previously.

According to the measurement method of this aspect, by projecting and displaying at least one measurement point on the projection screen and detecting the position, the zoom ratio of the projection optical system can be determined. Therefore, in the projection optical system having the zoom function, the measurement accuracy of the zoom ratio can be improved.

According to a second aspect of the invention, in the measurement method of the first aspect of the invention, step (b) includes (b1) detecting an image of the projected measurement point on a captured image obtained by capturing the projected measurement point from the measurement point detection position by an image capturing section, and a direction vector of an optical axis of the image capturing section and a direction vector having a direction in which the measurement point has an offset from an optical axis of the projection optical system in the original image of the measuring image are substantially perpendicular to each other.

According to the measurement method of this aspect, on the captured image, the direction in which the image of the measurement point moves in accordance with the variation in the zoom ratio of the projection optical system and the direction along which the measurement point moves in accordance with the variation of the projection distance are substantially perpendicular to each other. Therefore, the detection accuracy of the variation in the position of the image of the measurement point on the captured image due to the variation of the zoom ratio is improved, and thus the measurement accuracy of the zoom ratio can be improved. It should be noted that an image called an "original image" in the present specification includes an image formed on the liquid crystal panel in an anterior stage of the projection optical system for forming the projection image.

According to a third aspect of the invention, in the measurement method of the second aspect of the invention, the position information includes coordinates of the image of the projected measurement point on the captured image, and step (c) includes (c1) determining the zoom ratio corresponding to the coordinates of the image using the coordinates of the image and the correspondence between the coordinates of the image and the zoom ratio, the correspondence being prepared previously.

According to the measurement method of this aspect, since the zoom ratio can uniquely be determined using the map prepared previously, the measurement of the zoom ratio becomes easy.

According to a fourth aspect of the invention, there is provided a method of correcting an image for correcting a projection image displayed by projecting image light representing an original image on a projection screen via a projection optical system provided with a zoom mechanism, the method including (a) projecting and displaying a measuring image including a measurement point on the projection screen so that the measurement point is displayed at a position with an offset from an optical axis of the projection optical system, (b) detecting a projected measurement point, which is the measurement point projected and displayed on the projection screen, from a measurement point detection position having a fixed position relative to the projection optical system, (c) determining the zoom ratio using position information of the detected projected measurement point detected and correspondence between the position information and the zoom ratio, the correspondence being prepared previously, and (d) correcting keystone distortion of the projection image using the determined zoom ratio.

According to the correction method of the image of this aspect, even in the case in which the focal distance is varied due to the variation in the zoom ratio of the projection optical system, the focal distance thus varied can be reflected to the keystone distortion correction of the original image. Therefore, in the projector provided with the projection optical system having the zoom mechanism, further appropriate image correction of the projection image becomes possible.

According to a fifth aspect of the invention, in the image correction method of the fourth aspect of the invention, step (b) includes (b1) detecting an image of the projected measurement point on a captured image obtained by capturing the projected measurement point from the measurement point detection position by an image capturing section, and a direction vector of an optical axis of the image capturing section and a direction vector having a direction in which the measurement point has an offset from an optical axis of the projection optical system in the original image of the measuring image are substantially perpendicular to each other.

According to the correction method of this aspect, the zoom ratio can be measured with further good accuracy, and can be reflected to the keystone distortion correction of the original image. Therefore, the image quality of the display image can be improved.

According to a sixth aspect of the invention, in the image correction method of the fifth aspect of the invention, the position information includes coordinates of the image of the projected measurement point on the captured image, and step (c) includes (c1) determining the zoom ratio corresponding to the coordinates of the image using the coordinates of the image and the correspondence between the coordinates of the image and the zoom ratio, the correspondence being prepared previously.

According to the correction method of this aspect, the zoom ratio can easily be measured, and can be reflected to the distortion correction of the original image. Therefore, the image quality of the display image can be improved.

According to a seventh aspect of the invention, there is provided a projector adapted to display a projection image by projecting image light representing an original image on a projection screen, including a projection optical system provided with a zoom mechanism, and adapted to project the image light on the projection screen, a measurement point detection section adapted to detect a projected measurement point included in a measuring image projected from the projection optical system to the projection screen, and a control section adapted to execute a correction of the projection image, wherein the projected measurement point includes a zoom ratio measuring projected measurement point projected and displayed at a position with an offset from an optical axis of the projection optical system, the measurement point detection section is disposed at a measurement point detection position having a fixed relative position to the projection optical system, and the control section obtains position information of the detected zoom ratio measuring projected measurement point, determines the zoom ratio using correspondence between the position information and a zoom ratio corresponding to the position information, the correspondence being prepared previously, and executes correction of the projection image using the zoom ratio determined.

According to an eighth aspect of the invention, in the projector of the seventh aspect of the invention, the measurement point detection section includes an image capturing section adapted to capture the projected measurement point, and a direction vector of an optical axis of the image capturing section and a direction vector having a direction in which the zoom ratio measuring projected measurement point has an offset from an optical axis of the projection optical system in the original image of the measuring image are substantially perpendicular to each other.

According to a ninth aspect of the invention, in the projector of the eighth aspect of the invention, the position information includes coordinates of an image of the zoom ratio measuring projected measurement point on a captured image captured by the image capturing section, and the control section determines the zoom ratio corresponding to the coordinates of the image using the coordinates of the image and the correspondence between the image and the zoom ratio, the correspondence being prepared previously.

It should be noted that the invention can be realized in various forms, such as a zoom ratio measurement method and a zoom ratio measurement apparatus of a projection optical system having a zoom mechanism, a control method of a zoom ratio measurement apparatus and a control device of a zoom ratio measurement apparatus, a computer program for realizing the function of these method or the apparatus, or a recording medium storing the computer program.

BRIEF DESCRIPTION OF THE DRAWINGS

The invention will now be described with reference to the accompanying drawings, wherein like numbers reference like elements.

DESCRIPTION OF EXEMPLARY EMBODIMENTS

A. Embodiment

Figure 1:
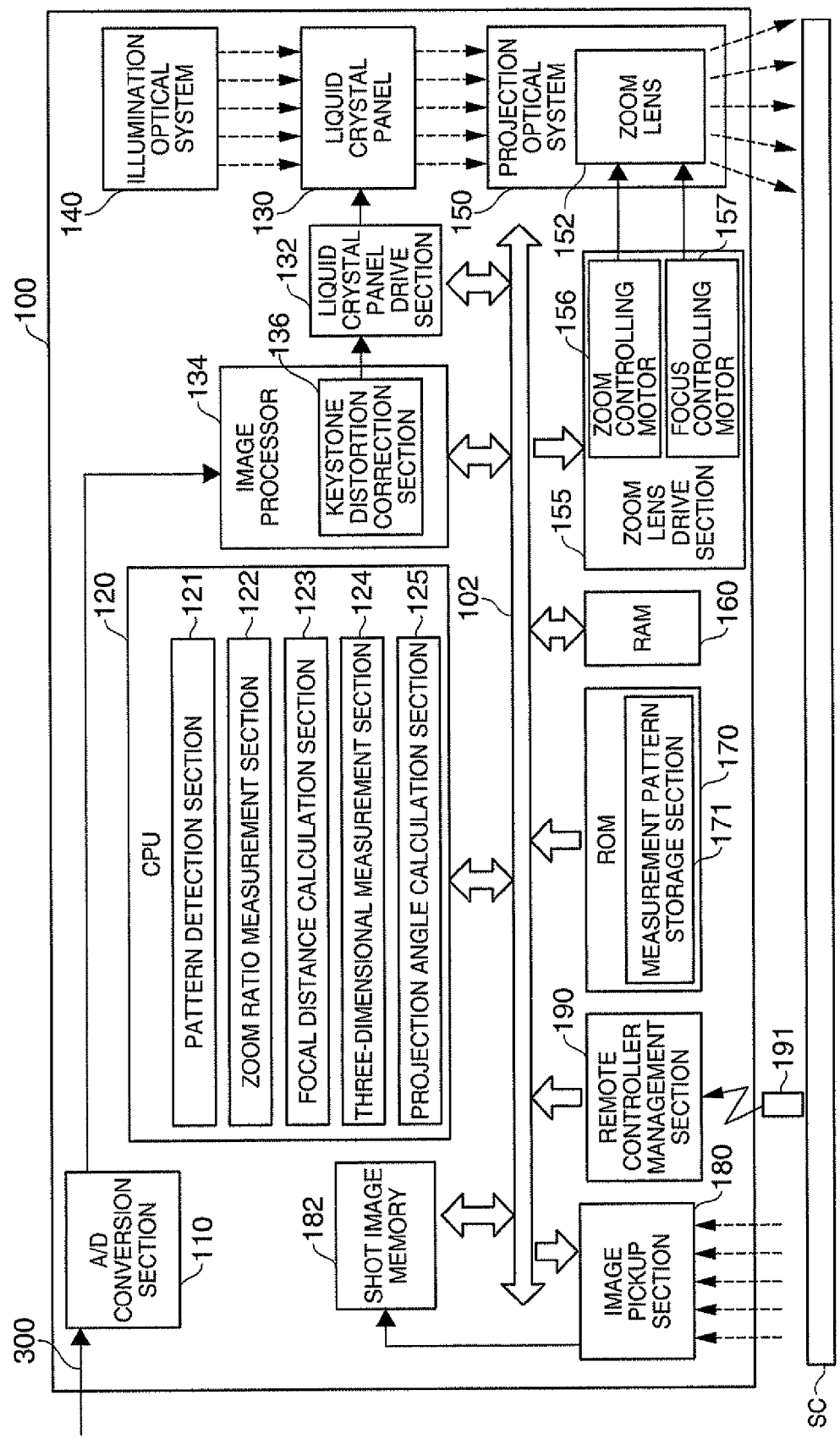
FIG. 1 is a schematic block diagram showing an internal configuration of a projector.

FIG. 1 is a block diagram schematically showing an internal configuration of a projector as an embodiment of the invention. The projector 100 projects image light representing an image on a projection surface such as a projection screen SC, thereby displaying the image.

The projector 100 is provided with an A/D conversion section 110, a central processing unit (CPU) 120, an image processor 134, an internal memory (RAM) 160, a nonvolatile storage section (ROM) 170, and a captured image memory 182. The projector 100 is further provided with an illumination optical system 140, a liquid crystal panel 130, a projection optical system 150, a liquid crystal panel drive section 132, a zoom lens drive section 155, an image capturing section 180, a remote controller management section 190, and a remote controller 191. It should be noted that the CPU 120, the liquid crystal panel drive section 132, the image processor 134, the zoom lens drive section 155, the RAM 160, the ROM 170, the image capturing section 180, the captured image memory 182, and the remote controller management section 190 are connected to each other via an internal bus 102.

The projector 100 accepts an instruction input, which is related to an operation of the projector 100, from the user via the remote controller 191. The remote controller 190 receives a signal representing the instruction input by the user from the remote controller 191, and transmits the signal to the CPU 120. The CPU 120 controls each constituent of the projector 100 in accordance with the signal.

The projector 100 receives an image signal representing a display image from external equipment such as a DVD player or a personal computer not shown via a cable 300. The analog image signal input from the external equipment is converted by the A/D conversion section 110 into a digital image signal, and the result is supplied to the image processor 134.

The image processor 134 is provided with a keystone distortion correction section 136. The keystone distortion correction section 136 executes the keystone correction on the digital image signal input from the A/D conversion section 110. The keystone correction will be described later. It should be noted that in the present specification, the image represented by the digital image signal output from the A/D conversion section 110 will hereinafter be referred to as an "uncorrected original image." On the other hand, the image represented by the digital image signal having been corrected by the image processor 134 is referred to as a "corrected original image" or simply as an "original image."

Here, the CPU 120 is provided with a pattern detection section 121, a zoom ratio measurement section 122, a focal distance calculation section 123, a three-dimensional measurement section 124, and a projection angle calculation section 125. According to the cooperative process of these constituents 121 through 125, parameters for the keystone correction executed by the keystone distortion correction section 136 are determined. The specific content of the cooperative process thereof will be described later. It should be noted that each of the constituents 121 through 125 provided to the CPU 120 can be realized as a computer program stored in the RAM 160, and arranged to be loaded in the CPU 120 according to needs. On the other hand, it is possible that the keystone distortion correction section 136 of the image processor 134 is configured as hardware.

The image processor 134 outputs the digital image signal representing the corrected original image to the liquid crystal panel drive section 132. The liquid crystal panel drive section 132 drives the liquid crystal panel 130 based on the digital image signal. The liquid crystal panel 130 modulates the illumination light, which is emitted from the illumination optical system 140, into the image light representing the image. The image light output from the liquid crystal panel 130 is projected to the projection screen SC via the projection optical system 150. Hereinafter, in the present specification, the image projected and displayed on the projection screen SC will be referred to as a "projection image."

It should be noted that the projection optical system 150 is provided with a zoom lens 152. The zoom lens 152 is controlled in focal distance by a zoom controlling motor 156 and a focus controlling motor 157 of the zoom lens drive section 155. Thus, the projection image is controlled in display magnification and focus.

The image capturing section 180 is capable of capturing the projection screen SC on which the projection image is displayed. The projector 100 can detect the configuration state of the projection screen SC with respect to the projector 100 based on the captured image. Here, the "configuration state of the projection screen SC" means the location and the tilt angle of the projection screen SC with respect to the projector 100.

The image capturing section 180 is disposed at a position fixed relatively to the projection optical system 150, and is mainly composed of an image sensor such as a CMOS sensor or a CCD sensor. The captured image data of the image capturing section 180 is stored in the captured image memory 182 directly from the image capturing section 180. The CPU 120 is capable of loading the captured image data from the captured image memory 182 via the internal bus 102.

Figure 2A:
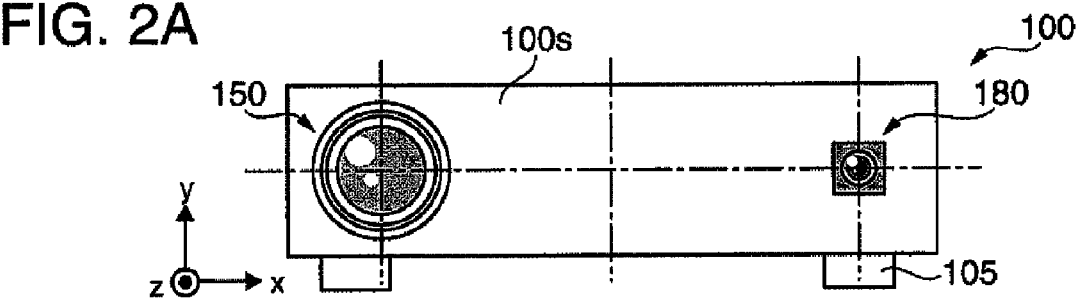
FIG. 2A is a schematic front view showing an external appearance of a projector.

FIG. 2A is a schematic front view showing the external appearance of the projector 100. It should be noted that three-dimensional directions (x, y, z directions) are indicated by arrows in FIG. 2A for the sake of convenience of explanations. The projector 100 has a substantially rectangular solid shape, and has the projection optical system 150 and the image capturing section 180 disposed in the same plane 100s along the direction of the arrow x and the direction of the arrow y. More specifically, the projection optical system 150 and the image capturing section 180 are disposed in parallel to each other along the direction (a direction of the long side) of the arrow x in the plane 100s, and at positions closer to the respective short sides of the plane 100s opposed to each other. It should be noted that on the bottom surface of the projector 100, there are disposed leg sections 105. The projector 100 is arranged so that the optical axis of the projection optical system 150 and the optical axis of the image capturing section 180 can be moved together with each other along the direction of the arrow y in the drawing by adjusting the lengths of the leg sections 105.

Figure 2B:
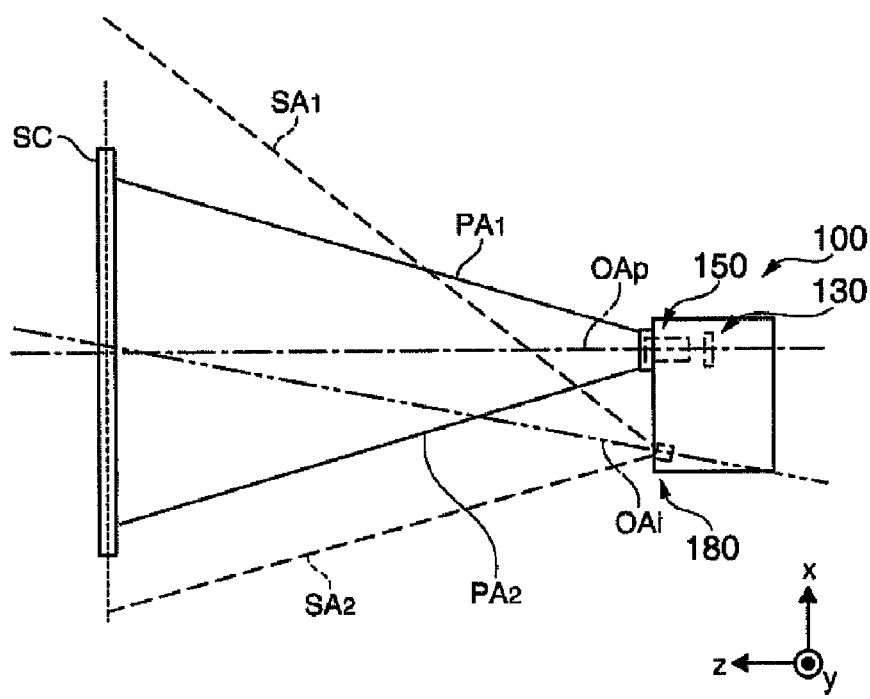
FIGS. 2B and 2C are schematic diagrams for explaining projection on the projection screen by the projector.
Figure 2C:
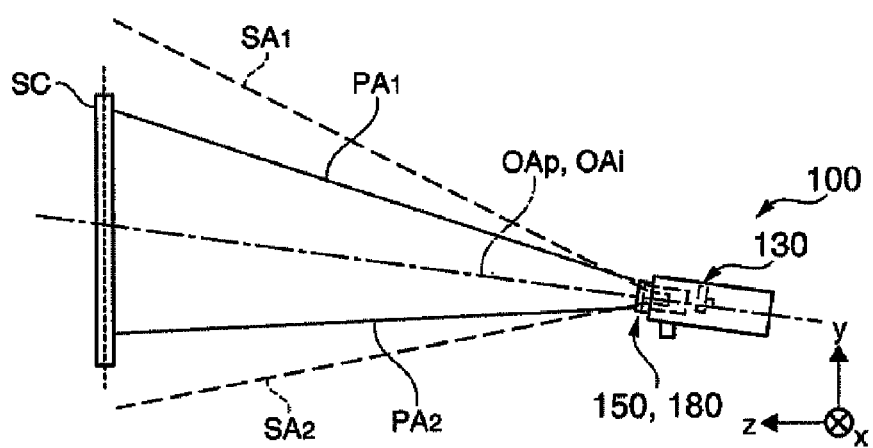

FIGS. 2B and 2C are explanatory diagrams schematically showing the condition in which the projection optical system 150 of the projector 100 projects the image light on the projection screen SC and the condition in which the image capturing section 180 captures the projection screen SC. It should be noted that the directions indicated by the arrows x, y, and z shown in FIGS. 2B and 2C correspond respectively to the directions indicated by the arrows x, y, and z shown in FIG. 2A.

The projection optical system 150 and the image capturing section 180 are disposed so that the optical axis OAp of the projection optical system 150 and the optical axis OAi of the image capturing section 180 intersect with each other when the projector 100 is viewed along a direction (in a direction along the arrow y) toward the upper surface (FIG. 2B). Further, when viewed along a direction (a direction along the arrow x) toward a side surface of the projector 100 (FIG. 2C), the two optical axes OAp, OAi substantially overlap with each other, and the optical axis OAp and the panel surface of the liquid crystal panel 130 are perpendicular to each other. It should be noted that the optical axis OAi is omitted from illustrations in FIG. 2C.

Here, the area wedged between two lines $PA_1$, $PA_2$ radially extending from the projection optical system 150 toward the projection screen SC represents the projection area of the image light. Further, the area wedged between two broken lines $SA_1$, $SA_2$ radially extending from the image capturing section 180 toward the projection screen SC represents the image capturing area by the image capturing section 180. As described above, the image capturing section 180 is capable of capturing the entire projection image on the projection screen SC.

Figure 3A:
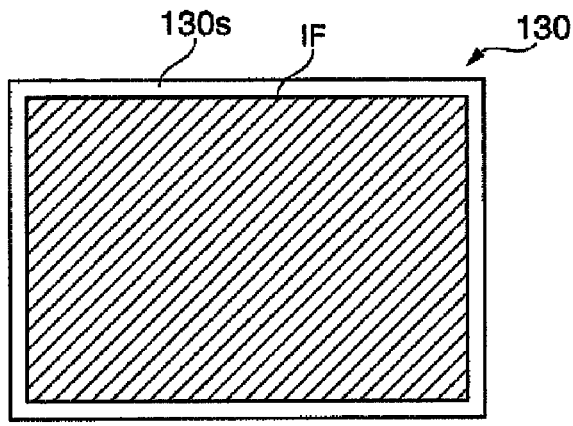
FIGS. 3A, 3B, and 3C are schematic diagrams showing a panel image of a liquid crystal panel, a projection image displayed on the projection screen, and a captured image by an image capturing section, respectively.
Figure 3B:
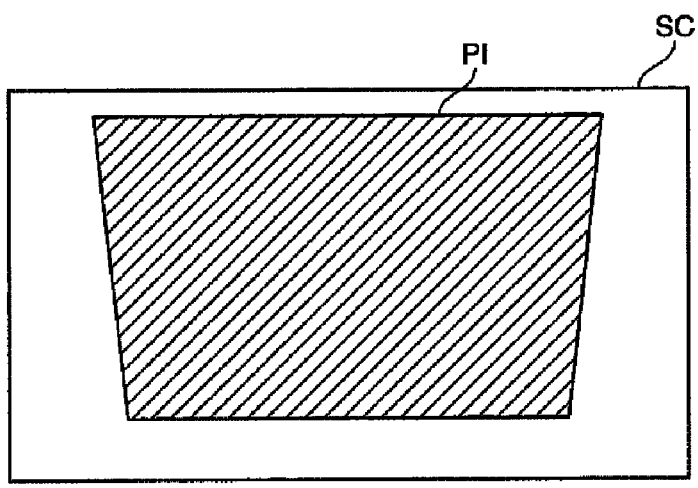
Figure 3C:
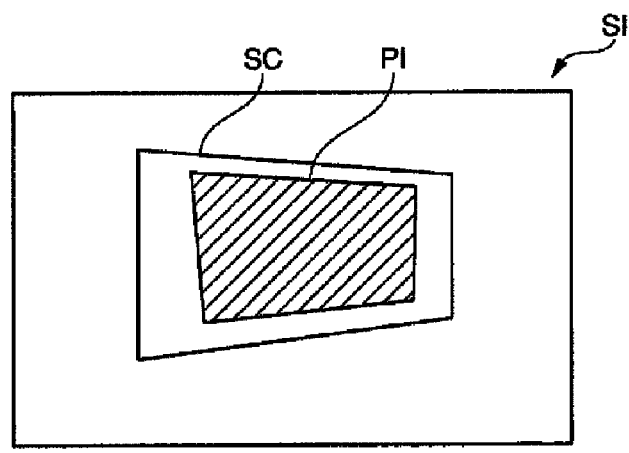

FIGS. 3A, 3B, and 3C are explanatory diagrams for explaining the relationship between the original image formed on the liquid crystal panel 130, the projection image, and the captured image of the image capturing section 180. FIG. 3A is a front view schematically showing the liquid crystal panel 130 (FIG. 1). The liquid crystal panel 130 has a substantially rectangular panel surface 130s. The liquid crystal panel 130 has an image forming area IF, which forms a panel image for modulating the illumination light into the image light, disposed on the panel surface 130s. The image forming area IF is composed of m×n (m, n are arbitrary real number) dots of pixels. It should be noted that although the image forming area IF of the present embodiment is formed as an internal area 2 dots smaller than the periphery of the panel surface 130s, the size of the image forming area IF can be set to be an arbitrary size.

FIG. 3B is a schematic diagram showing the condition in which an all-white projection image PI is projected and displayed on the projection screen SC. It should be noted that the all-white projection image PI is indicated by hatching for the sake of convenience. In the case in which the projector 100 and the projection surface of the projection screen SC are not opposed right to each other, but the projection surface of the projection screen SC is at a tilt with respect to the projector 100, the all-white projection image PT has a shape distorted in accordance with the tilt.

FIG. 3C is a schematic diagram showing the captured image SI obtained by the image capturing section 180 capturing the projection screen SC with the all-white projection image PI shown in FIG. 3B displayed thereon. Since the image capturing section 180 performs capturing from the position laterally apart from the projection optical system 150 toward the projection screen SC in a direction oblique thereto, the projection screen SC becomes to have a shape distorted to be a substantially trapezoidal shape.

In projectors, in general, the optical axis of the projection optical system and the projection surface of the image light are not disposed so as to intersect perpendicularly to each other in most cases, and if the original image is projected directly, the projection image is distorted as shown in FIG. 3B. Therefore, in the projector 100, the configuration state of the projection screen SC with respect to the projector 100 is detected, and the keystone correction process for correcting the keystone distortion of the original image in accordance with the configuration state is executed.

Figure 4:
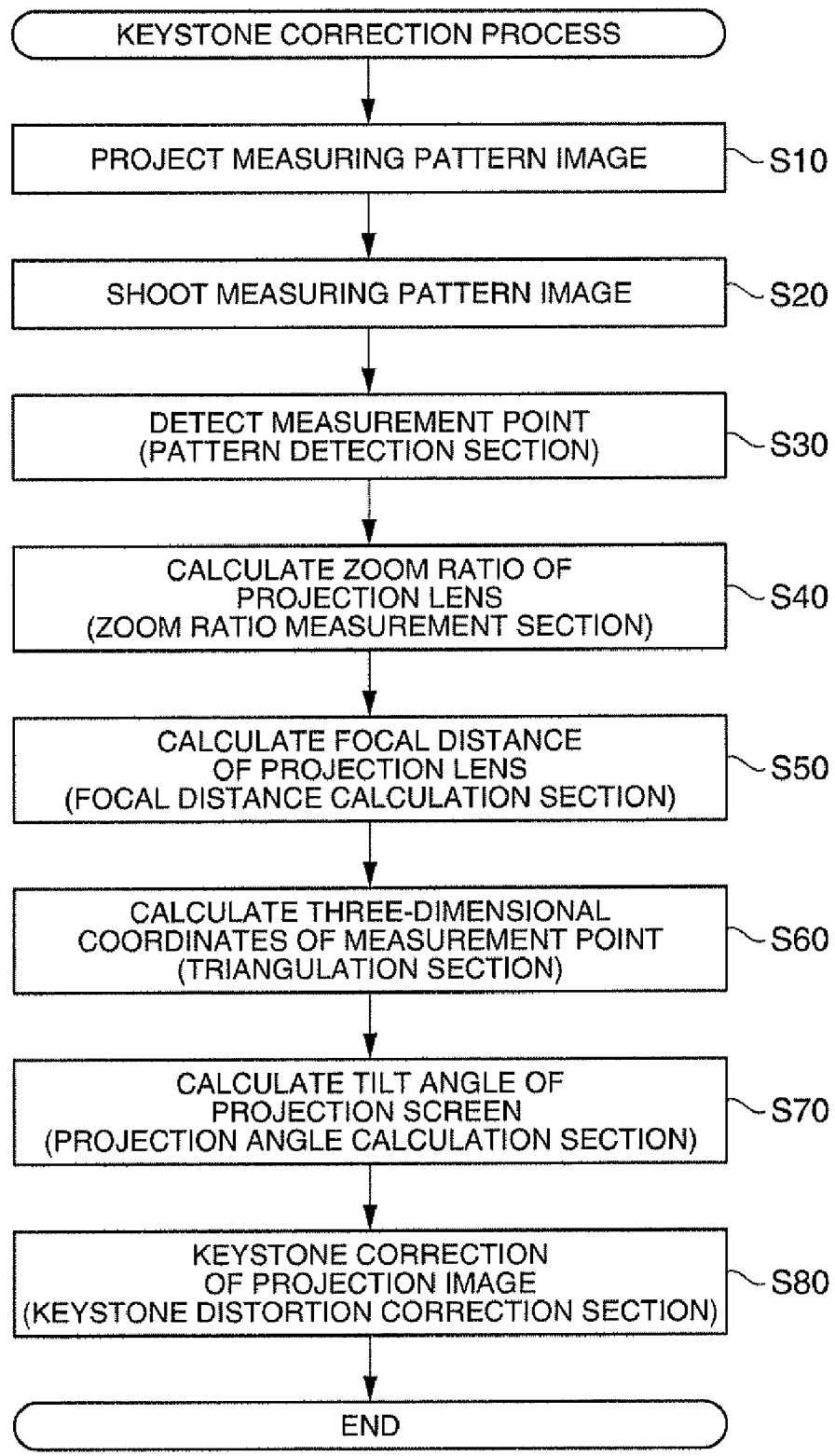
FIG. 4 is a flowchart showing a processing procedure of a keystone correction process.
Figure 5:
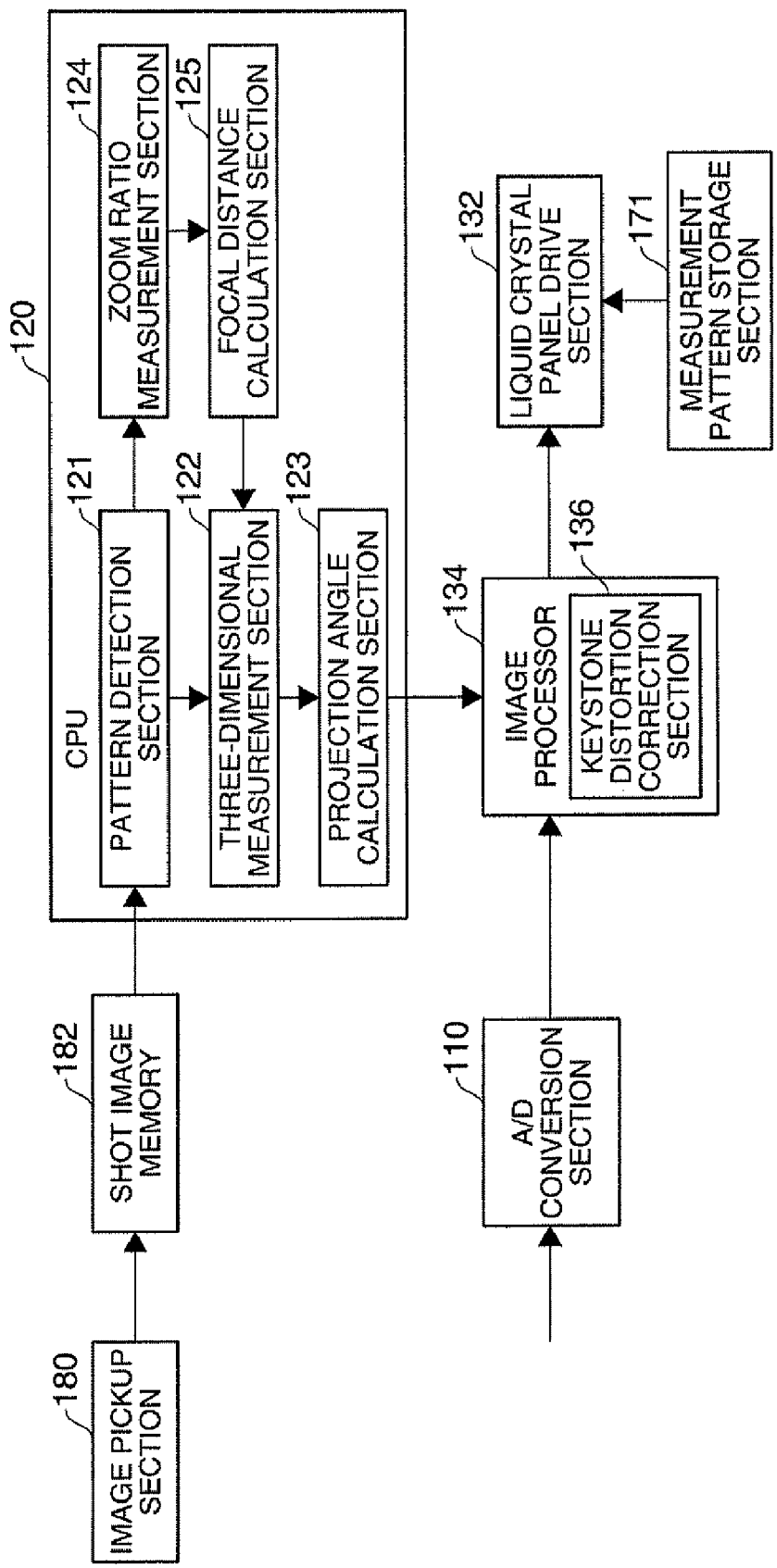
FIG. 5 is a functional block diagram of the projector in the keystone correction process.

FIG. 4 is a flowchart showing a processing procedure of the keystone correction process executed in the projector 100. FIG. 5 is a block diagram showing internal functions of the projector 100 when executing the keystone correction process. FIG. 5 is obtained by partially rewriting the internal configuration of the projector 100 shown in FIG. 1, and the reference numerals of the constituents correspond respectively to each other. It should be noted that it is possible to arrange that the keystone correction process is started in response to an instruction from the user via the remote controller 191 (FIG. 1), or that the keystone correction is executed at every start-up of the projector 100.

In the step S10 (FIG. 4), the projector 100 projects a measuring pattern image for measuring the configuration state of the projection screen SC on the projection screen SC. As a specific processing procedure in the step S10, the CPU 120 transmits the image data representing the measuring pattern image MI, which has previously been stored in a measurement pattern storage section 171 of the ROM 170 as a read-only storage section, to the liquid crystal panel drive section 132. The liquid crystal panel drive section 132 makes the liquid crystal panel 130 form the panel image representing the measuring pattern image MI in the image forming area IF. Thus, the measuring pattern image MI is displayed on the projection screen SC via the projection optical system 150.

Figure 6A:
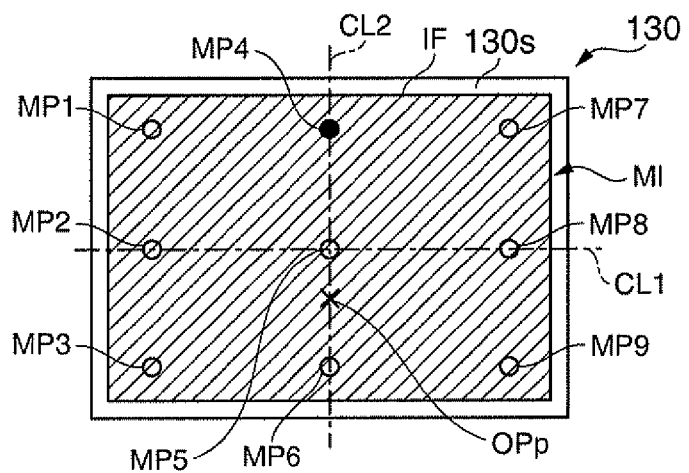
FIGS. 6A, 6B, and 6C are explanatory diagrams for explaining a measuring pattern image.

FIG. 6A is an explanatory diagram showing an example of the measuring pattern image MI, and schematically shows the liquid crystal panel 130 having the measuring pattern image MI formed in the image forming area IF thereof. FIG. 6A is substantially the same as FIG. 3A except the point that the measuring pattern image MI is formed in the image forming area IF, and the point that an intersection OPp (hereinafter referred to as a "panel optical axis intersection OPp") between the optical axis of the projection optical system 150 and the panel surface 130s is indicated by the symbol "x." It should be noted that in FIG. 6A, a first center line CL1 passing through the midpoints of respective two short sides of the panel surface 130s opposed to each other and a second center line CL2 passing through the midpoints of respective two long sides of the panel surface 130s opposed to each other are illustrated by dashed lines for the sake of convenience of explanations.

The measuring pattern image MI has nine measurement points MP1 through MP9 having coordinates in the image plane fixed previously. The measuring points MP1 through MP9 are disposed in the image plane so as to be aligned in a 3×3 matrix evenly in vertical and lateral directions. More specifically, the measurement points MP1 through MP3 are disposed as the first column from the left of the viewer of the sheet of FIG. 6A, the measurement points MP4 through MP6 are disposed as the second column, and the measurement points MP7 through MP9 are disposed as the third column. It should be noted that the smaller the number in the reference symbol is, the closer to the top of the sheet the measurement point is disposed. Further, on the first center line CL1 the measurement points MP2, MP5, and MP8 are located, and on the second center line CL2 the measurement points MP4 through MP6 are located. Here, the measurement point MP4 is used in a zoom ratio measurement process for the projection optical system 150 in the steps S40 through S50 described later, and therefore, is illustrated by a black circle for the sake of convenience of discrimination, unlike the other measurement points MP1 through MP3 and MP5 through MP9 illustrated by white circles. Hereinafter, the measurement point MP4 is referred to as a "zoom ratio measurement point MP4."

Incidentally, in the projector 100, the optical axis of the projection optical system 150 is provided with an offset downward from the center of the panel surface 130s in order for reducing the distortion of the projection image caused by the fact that the optical axis of the projection optical system 150 has an elevation angle with the projection surface. Specifically, the positions of the projection optical system 150 and the liquid crystal panel 130 are determined so that the panel optical axis intersection OPp is located on the second center line CL2 and lower than the first center line CL1 on the sheet. It should be noted that the liquid crystal panel 130 is disposed inside the projector 100 so as to be perpendicular to the optical axis OAp of the projection optical system 150 (FIGS. 2B and 2C).

Figure 6B:
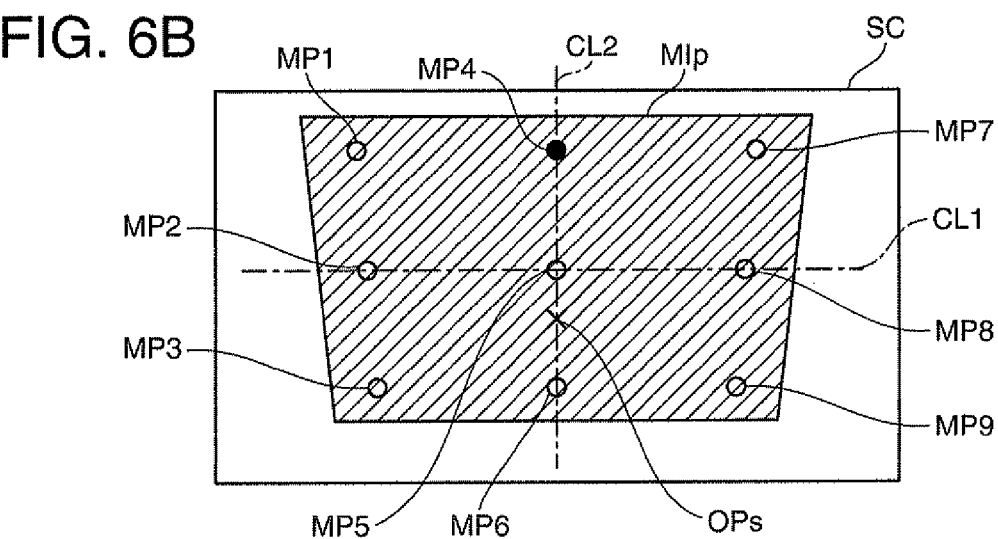

FIG. 6B is a schematic diagram showing the condition in which the measuring pattern image MI shown in FIG. 6A is projected and displayed on the projection screen SC. FIG. 6B is substantially the same as FIG. 3B except the point that the projection image (hereinafter referred to as a "measuring projection image MIp") of the measuring pattern image MI is added. The measuring projection image MIp is substantially the same as the measuring pattern image MI shown in FIG. 6A except the point that it is distorted on the projection surface to have a substantially trapezoidal shape. It should be noted that an intersection OPs (hereinafter referred to as a "screen optical axis intersection OPs") between the optical axis of the projection optical system 150 and the projection surface of the projection screen SC is indicated by the symbol "x" in FIG. 6B. In the step S20 (FIG. 4), the image capturing section 180 (FIG. 5) captures the projection screen SC with the measuring projection image MIp displayed thereon.

Figure 6C:
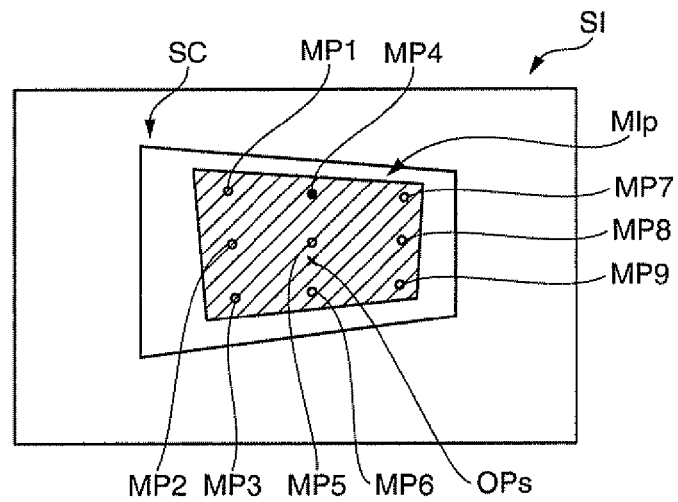

FIG. 6C is a schematic diagram showing the captured image SI captured by the image capturing section 180. The measurement points MP1 through MP9 on the projection screen SC are reflected in the captured image SI. It should be noted that the screen optical axis intersection OPs is indicated by the symbol "x" in FIG. 6C. The image capturing section 180 stores the image data (hereinafter referred to as "captured image data") representing the captured image SI in the captured image memory 182.

In the step S30 (FIG. 4), the CPU 120 loads the captured image data stored in the captured image memory 182. Further, the pattern detection section 121 of the CPU 120 detects the measurement points MP1 through MP9 reflected in the captured image SI, and at the same time, detects the coordinates of each of the measurement points MP1 through MP9 in the captured image plane. Specifically, the pattern detection section 121 detects the measurement points MP1 through MP9 based on the contrast ratio of the image, and then obtains the coordinates of the center of gravity of the pixels representing each of the measurement points MP1 through MP9.

The pattern detection section 121 further transmits the coordinate data of the zoom ratio measurement point MP4 of the coordinate data thus obtained to the zoom ratio measurement section 122. In the step S40, the zoom ratio measurement section 122 measures the current zoom ratio of the projection optical system 150 using the coordinate data of the zoom ratio measurement point MP4.

Here, the zoom ratio of the projection optical system 150 is controlled and varied by the zoom lens drive section 155 (FIG. 1). In response to the variation in the zoom ratio, the projection optical system 150 also varies the focal distance thereof. The focal distance of the projection optical system 150 is one of the parameters used in triangulation for obtaining the configuration state of the projection screen SC with respect to the projector 100 described later. Therefore, by measuring the zoom ratio of the projection optical system 150 with good accuracy, the triangulation can more accurately be performed. Hereinafter, the principle of measuring the zoom ratio of the projection optical system 150 will be explained.

Figure 7A:
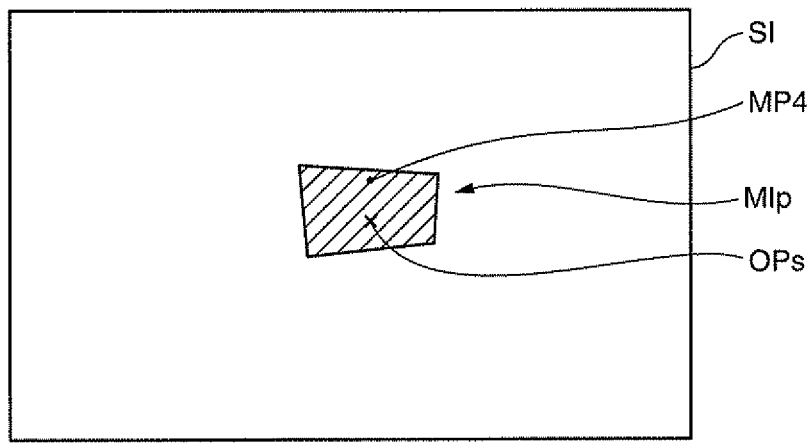
FIGS. 7A, 7B, and 7C are explanatory diagrams for explaining the principle of a method of measuring a zoom ratio of a projection optical system.
Figure 7B:
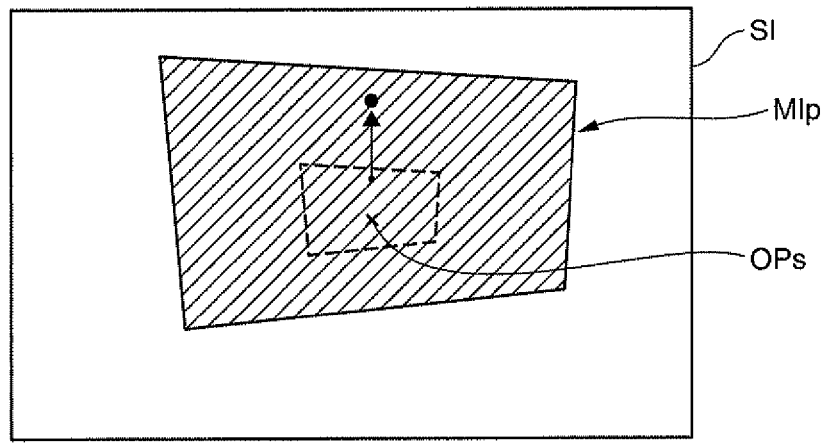

FIGS. 7A, 7B, 7C, and 8 are explanatory diagrams for explaining the relationship between the zoom ratio of the projection optical system 150 and the zoom ratio measurement point MP4. FIGS. 7A and 7B are schematic diagrams showing the captured image SI obtained by capturing the measuring projection image MIp projected and displayed on the projection screen SC having the same configuration state when setting the zoom ratio of the projection optical system 150 to be the minimum and the maximum, respectively. FIGS. 7A and 7B are substantially the same as FIG. 6C except the point that the measuring projection image MIp with different display magnification is displayed, and the point that the measurement points MP1 through MP3 and MP5 through MP9 other than the zoom ratio measurement point MP4 and the projection screen SC are omitted from the illustration. Further, in FIG. 7B, the measuring projection image MIp projected and displayed with the minimum magnification is illustrated with broken lines.

As shown in FIGS. 7A and 7B, when the zoom ratio of the projection optical system 150 is varied from the minimum to the maximum, the measuring projection image MIp varies the projection size thereof centering on the screen optical axis intersection OPS. On this occasion, the zoom ratio measurement point MP4 moves linearly in a direction (indicated by the arrow) along which the distance from the screen optical axis intersection OPs increases in accordance with the variation in the zoom ratio.

Figure 7C:
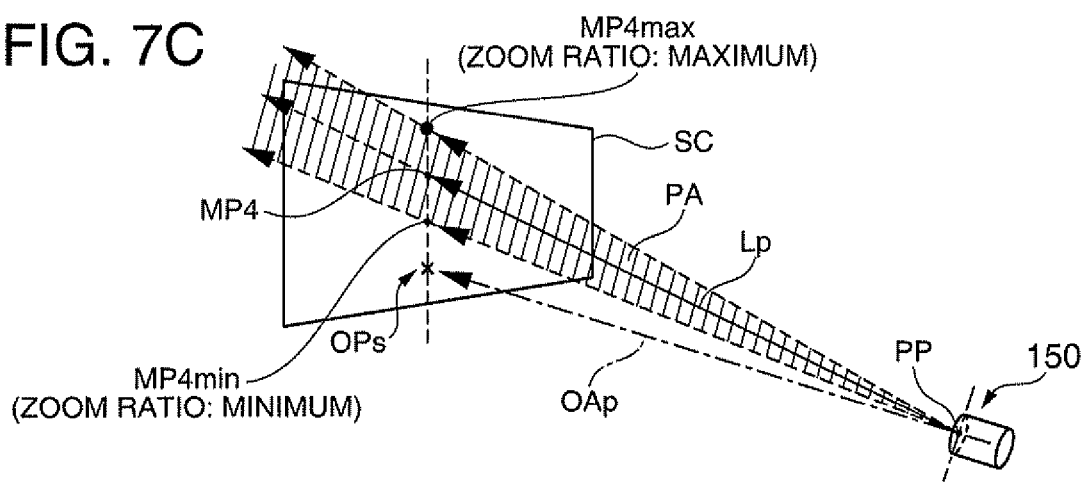

FIG. 7C is a diagram schematically showing the state of the projection optical system 150 projecting the zoom ratio measurement point MP4 on the projection screen SC. FIG. 7C schematically shows the projection optical system 150, the projection screen SC, the projection images MP4min, MP4max of the zoom ratio measurement point MP4 with the minimum zoom ratio of the projection optical system 150 and the maximum zoom ratio thereof, respectively. Further, FIG. 7C schematically shows the optical axis OAp of the projection optical system 150 and the screen optical axis intersection OPs. It should be noted that the optical axis OAp is illustrated with a dashed line.

Here, a straight line Lp connecting the principal point PP of the projection optical system 150 and the zoom ratio measurement point MP4 projected and displayed on the projection screen SC is considered. The straight line Lp is a trajectory of the image light representing the zoom ratio measurement point MP4. The trajectory Lp of the image light is varied in the tilt around the principle point PP when varying the zoon ratio of the projection optical system 150 from the minimum to the maximum, and thus forming a plane area PA indicated by hatching. In other words, the tilt of the straight line Lp on the plane area PA and the zoom ratio of the projection optical system 150 have a unique relationship. Therefore, if the coordinates in the world coordinate system of the zoom ratio measurement point MP4 displayed on the projection screen SC can be specified, it becomes possible to obtain the straight line Lp based on the coordinates and the coordinates of the principal point PP of the projection optical system 150, and thus the zoom ratio of the projection optical system 150 can uniquely be specified.

Figure 8:
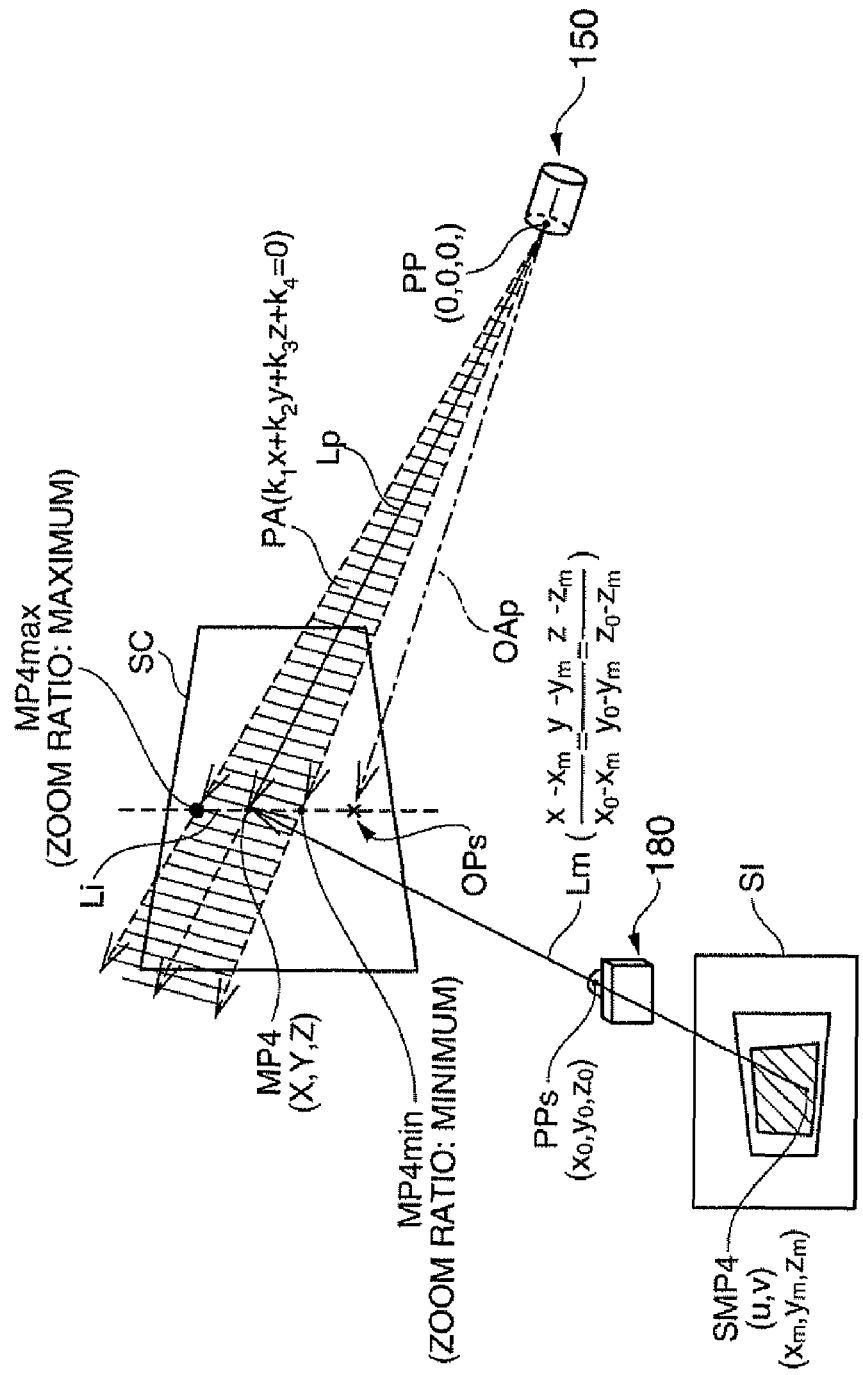
FIG. 8 is an explanatory diagram for explaining the principle of the method of measuring the zoom ratio of the projection optical system.

FIG. 8 is a diagram schematically showing the relationship between the captured image SI of the image capturing section 180 and the zoom ratio measurement point MP4 thus projected. FIG. 8 is substantially the same as FIG. 7C except the point that the image capturing section 180 and the captured image SI thereof are added to FIG. 7C. It should be noted that the captured image SI is shown as an image inverted by the lens of the image capturing section 180. Further, in order for distinguishing between the zoom ratio measurement point MP4 projected and displayed on the projection screen SC and the zoom ratio measurement point MP4 reflected in the captured image SI, the zoom ratio measurement point MP4 in the captured image SI will be described as the "zoom ratio measurement point SMP4" in the following explanations.

Here, an imaginary straight line Lm connecting between the principal point PPS of the image capturing section 180 and the projection image of the zoom ratio measurement point MP4 on the projection screen SC is considered. The straight line Lm passes through the zoom ratio measurement point SMP4 in the captured image SI and the principal point PPs of the image capturing section 180. Since the coordinates of the principal point PPs of the image capturing section 180 are given, the straight line Lm can be determined based on the coordinates of the zoom ratio measurement point SMP4 in the captured image SI. Here, the zoom ratio measurement point MP4 projected on the projection screen SC is a point on the plane area PA. Therefore, the coordinates of the projection image of the zoom ratio measurement point MP4 on the projection screen SC can be obtained as an intersection between the imaginary straight line Lm and the plane area PA.

Here, the world coordinate system having the principal point PP of the projection optical system 150 as the origin is considered. As described above, the plane area PA defined by the light beam projecting the zoom ratio measurement point MP4 projected on the projection screen SC is given, and the expression of the plane is generally given as the following formula (1).

$$k_1 x + k_2 y + k_3 z + k_4 = 0 \quad (1)$$

Here, $k_1$ through $k_4$ are constants.

Meanwhile, the expression of the imaginary straight line Lm passing through the principal point PPs of the image capturing section 180 and the zoom ratio measurement point SMP4 on the captured image SI is given as the following formula (2).

$$\frac{x - x_m}{x_0 - x_m} = \frac{y - y_m}{y_0 - y_m} = \frac{z - z_m}{z_0 - z_m} \quad (2)$$

Here, $x_0$, $y_0$, and $z_0$ are coordinates of the principal point PPs of the image capturing section 180, and $x_m$, $y_m$, and $z_m$, are coordinate of the zoom ratio measurement point SMP4 on the captured image SI, all of which are the coordinates in the world coordinate system. It should be noted that the coordinates $x_m$, $y_m$, and $z_m$ of the zoom ratio measurement point SMP4 on the captured image SI can be calculated based on the coordinates u, v of the zoom ratio measurement point SMP4 in the coordinate system on the captured image SI using a known coordinate conversion process.

The coordinates of the zoom ratio measurement point MP4 on the projection screen can be obtained by solving the following simultaneous equations using the formulas (1) and (2) described above.

$$k_1 x + k_2 y + k_3 z + k_4 = 0 \quad (3a)$$

$$\frac{x - x_m}{x_0 - x_m} = \frac{y - y_m}{y_0 - y_m} \quad (3b)$$

$$\frac{x - x_m}{x_0 - x_m} = \frac{z - z_m}{z_0 - z_m} \quad (3c)$$

The coordinates $x_m$, $y_m$, and $z_m$ of the zoom ratio measurement point SMP4 on the captured image SI are the only constants varied in accordance with the variation in the zoom ratio among the constants included in the formulas (3a), (3b), and (3c). Further, the coordinates $x_m$, $y_m$, and $z_m$, are calculated based on the coordinates u, v of the zoom ratio measurement point SMP4 in the coordinate system on the captured image SI using the known coordinate conversion process. On the other hand, the coordinates of the zoom ratio measurement point MP4 on the projection screen SC obtained by solving the formulas (3a), (3b), and (3c) uniquely correspond to the zoom ratio. Therefore, it is possible to uniquely determine the zoom ratio by measuring the coordinates u, v of the zoom ratio measurement point SMP4 in the coordinate system on the captured image SI.

As described above, it is possible to make a unique correlation between the coordinates u, v in the image plane of the zoom ratio measurement point SMP4 in the captured image SI and the zoom ratio of the projection optical system 150. Therefore, the zoom ratio measurement section 122 (FIG. 5) of the present embodiment is previously provided with a map having the coordinates u, v in the captured image SI and the zoom ratio of the projection optical system 150 corresponding to each other, and specifies the zoom ratio of the projection optical system 150 using the map.

Incidentally, the position of the zoom ratio measurement point SMP4 in the captured image SI is moved in accordance not only with the variation in the zoom ratio of the projection optical system 150, but also with the variation in the distance (hereinafter referred to as a "measurement point projection distance") from the principal point PP of the projection optical system 150 to the projection position of the zoom ratio measurement point MP4 on the projection screen SC. Therefore, by detecting the position of the zoom ratio measurement point SMP4 in the captured image SI, it is also possible to measure the measurement point projection distance together with the zoom ratio of the projection optical system 150.

Figure 9:
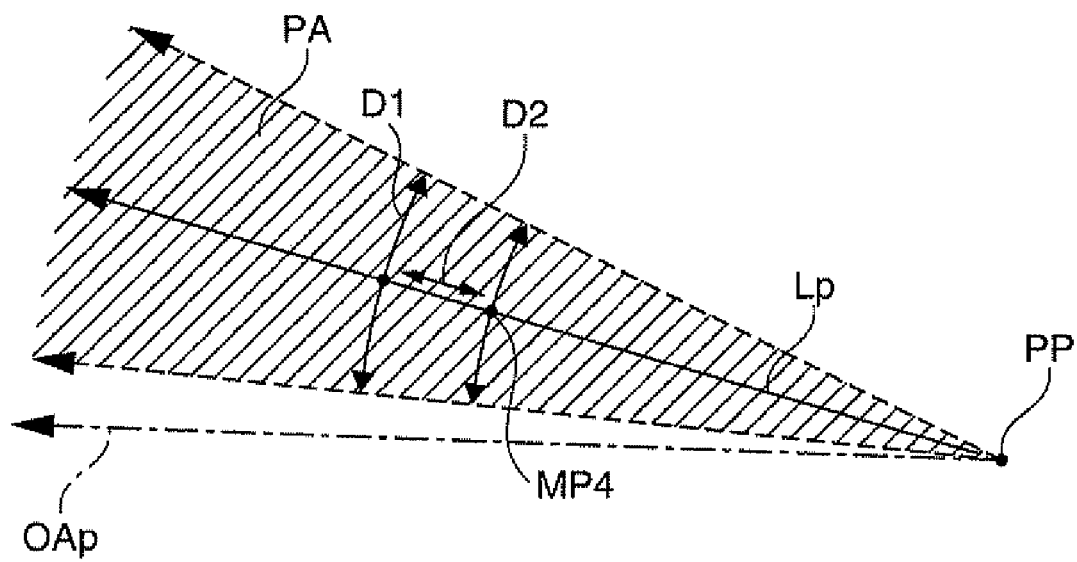
FIG. 9 is an explanatory diagram for explaining a variation in position of a zoom ratio measurement point MP4 due to a variation of the zoom ratio and a variation of a measurement point projection distance of the projection optical system.

FIG. 9 is a schematic diagram of the imaginary plane area PA shown in FIG. 8 viewed from a direction opposed right thereto, and schematically shows the variation in the position of the zoom ratio measurement point MP4 on the imaginary plane area PA. FIG. 9 shows the imaginary plane area PA, the principal point PP of the projection optical system 150, the trajectory Lp of the image light as the imaginary straight line, and optical axis OAp of the projection optical system 150.

Here, the case in which the zoom ratio of the projection optical system 150 is varied while holding the measurement point projection distance constant is assumed. As explained with reference to FIG. 8, the tilt of the imaginary straight line Lp varies around the principal point PP of the projection optical system 150 in accordance with the variation in the zoom ratio of the projection optical system 150. Therefore, in this case, the trajectory of the zoom ratio measurement point MP4 in accordance with the variation in the zoom ratio of the projection optical system 150 draws a circle centered on the principal point PP of the projection optical system 150 on the imaginary plane area PA.

On the other hand, the case in which the measurement point projection distance is varied while holding the zoom ratio of the projection optical system 150 constant is assumed. On this occasion, the zoom ratio measurement point MP4 moves on the imaginary straight line Lp in accordance with the variation of the measurement point projection distance. As described above, the zoom ratio of the projection optical system 150 can be specified by specifying the tilt of the imaginary straight line Lp, and the measurement point projection distance can be specified by specifying the position of the zoom ratio measurement point MP4 on the imaginary straight line Lp thus specified. It should be noted that if the tilt angle of the projection screen SC is given, it is possible to obtain the projection distance (the distance between the principal point PP of the projection optical system 150 and the screen optical axis intersection OPs) using the measurement point projection distance and the offset distance between the zoom ratio measurement point MP4 and the panel optical axis intersection OPp.

Further, as is understood from FIG. 9, the moving direction D1 of the zoom ratio measurement point MP4 in accordance with the variation in the zoom ratio of the projection optical system 150 and the moving direction D2 of the zoom ratio measurement point MP4 in accordance with the variation of the measurement point projection distance are perpendicular to each other in the imaginary plane area PA. As long as these two directions D1, D2 are in the condition of being perpendicular to each other also on the captured image SI, it is possible to measure the variation of the zoom ratio and the variation of the measurement point projection distance separately from each other on the captured image SI, and thus the measurement accuracy thereof are improved. In order for making the two directions D1, D2 perpendicular to each other also in the captured image SI, it is preferable that the optical axis of the image capturing section 180 and the imaginary plane area PA are almost in the condition of being perpendicular to each other. In other words, in order for improving the measurement accuracy of the variation in the position of the zoom ratio measurement point MP4 in the imaginary plane area PA due to the respective variations of the zoom ratio and the measurement point projection distance, the closer to a right angle the angle formed between the optical axis of the image capturing section 180 and an imaginary infinite plane including the plane area PA is, the better. Therefore, in FIG. 2B, the more distantly from each other the projection optical system 100 and the image capturing section 180 are disposed in the direction along the x-axis, the better.

Alternatively, it is also possible that the capturing direction (the direction of the optical axis of the image capturing section 180) of the image capturing section 180 and the imaginary plane area PA are arranged to have a relationship as explained below.

Figure 10:
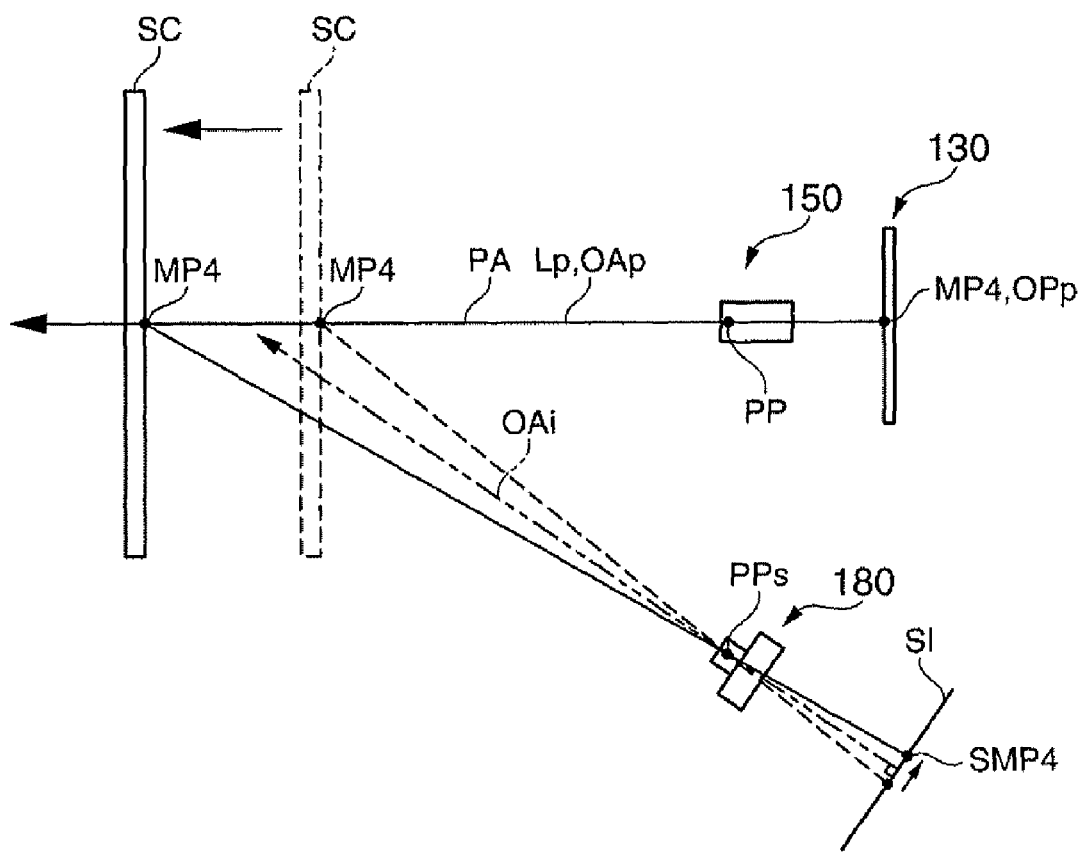
FIG. 10 is an explanatory diagram for explaining a positional relationship between the image capturing section and an imaginary plane area.

FIG. 10 is an explanatory diagram for explaining the capturing direction of the image capturing section 180 with respect to the imaginary plane area PA in the projector 100 according to the present embodiment. FIG. 10 is a schematic diagram similar to FIG. 8, and is different from FIG. 8 in the following points. In FIG. 10, the liquid crystal panel 130 and the optical axis OAi of the image capturing section 180 are added. Further, FIG. 10 is a diagram viewed from the direction in which the zoom ratio measurement point MP4 in the panel surface 130s of the liquid crystal panel 130 and the panel optical axis intersection OPp overlap with each other. It should be noted that this direction is a direction in which the optical axis OAp of the projection optical system 150 is disposed with an offset from the zoom ratio measurement point MP4 in the panel surface 130s of the liquid crystal panel 130 (the direction CL2 shown in FIGS. 6A and 6B). Hereinafter, the direction is referred to as a "optical axis offset direction." In the projector 100, the optical axis offset direction becomes perpendicular to each of the directions of the optical axis OAp of the projection optical system 150 and the optical axis OAi of the image capturing section 180 (FIG. 2C).

When viewed along the optical axis offset direction, the optical axis OAp of the projection optical system 150 and the trajectory Lp of the image light overlap with each other, and the imaginary plane area PA becomes a plane perpendicular to the sheet of the drawing. Therefore, the imaginary plane area PA is illustrated as a straight line. Further, the image plane of the captured image SI having the optical axis OAi of the image capturing section 180 as a normal line also becomes a plane perpendicular to the sheet of the drawing, and therefore illustrated as a straight line. It should be noted that the positions of the zoom ratio measurement points MP4, SMP4 are indicated by dots in the drawing.

Further, FIG. 10 schematically shows how the projection distance varies in accordance with the movement of the projection screen SC along the projection direction. It should be noted that for the sake of convenience of explanations, it is assumed that the projection screen SC is substantially parallel to the liquid crystal panel 130, and the projection screen SC moves along the normal lines of the projection screen SC and the liquid crystal panel 130. As described above, in the case in which the projection distance is varied, the position of the zoom ratio measurement point SMP4 in the captured image moves on the image toward a lateral direction. In contrast, in the case in which the zoom ratio of the projection optical system 150 is varied while keeping the projection distance constant, the position of the zoom ratio measurement point SMP4 moves toward the optical axis offset direction.

Here, in the projector 100 of the present embodiment, the angle formed between the direction vector of the optical axis offset direction and the direction vector of the optical axis OAi of the image capturing section 180 becomes substantially right-angle. According to such a configuration, the moving direction of the zoom ratio measurement point SMP4 on the screen of the captured image SI in accordance with the variation in the zoom ratio of the projection optical system 150 and the variation of the projection distance becomes the directions D1, D2 shown in FIG. 9. Therefore, it becomes possible to perform detection while easily separating between the moving direction D1 of the zoom ratio measurement point SMP4 in accordance with the variation of the projection distance and the moving direction D2 of the zoom ratio measurement point SMP4 in accordance with the variation in the zoom ratio of the projection optical system 150. Therefore, it becomes possible to improve measurement accuracy of the zoom ratio of the projection optical system 150.

It should be noted that the projector 100 according to the present embodiment further has a configuration in which the plane defined by the optical axis OAp of the projection optical system 150 and the optical axis OAi of the image capturing section 180 is perpendicular to the imaginary plane area PA. According to such a configuration, an amount of movement of the zoom ratio measurement point MP4 on the imaginary plane area PA in accordance with the variation of the zoom ratio of the projection optical system 150 and an amount of movement of the zoom ratio measurement point SMP4 on the captured image SI have a substantially linear relationship with each other. Therefore, it becomes possible to further improve the measurement accuracy of the zoom ratio. It should be noted that as described above, it is further preferable that the optical axis OAi of the image capturing section 180 and the imaginary plane area PA are perpendicular to each other.

In the step S 50 (FIG. 4), the focal distance calculation section 123 obtains the focal distance of the projection optical system 150 using the zoom ratio thus measured by the zoom ratio measurement section 122. In the step S60, the three-dimensional measurement section 124 (also referred to as a "triangulation section 124") detects the three-dimensional coordinates of the projection images of the other measurement points MP1 through MP3, and MP5 through MP9 by triangulation using the focal distance and other internal parameters of the projection optical system 150 and the image capturing section 180 having been measured previously. It should be noted that as the internal parameters of the projection optical system 150 and the image capturing section 180, there are cited, for example, the optical axis position of the projection optical system 150, the focal distance and the optical axis position of the image capturing section 180, a rotational amount and a translation amount between the projection optical system 150 and the image capturing section 180.

In the step S70, the projection angle calculation section 125 obtains the projection surface of the projection screen SC in the three-dimensional coordinate space by performing planar approximation on the three-dimensional coordinates of the measurement points MP1 through MP9 using, for example, a least-squares method, and thus the position and the tilt of the projection screen SC with respect to the projector 100 are calculated. In the step S80, these calculation results are output to the keystone distortion correction section 136 of the image processor 134. The keystone distortion correction section 136 executes the keystone correction process corresponding to the position and the tilt of the projection screen SC on the digital image signal representing the uncorrected original image received from the A/D conversion section 110 using these calculation results. The keystone distortion correction section 136 transmits the digital image signal representing the corrected original image to the liquid crystal panel drive section 132.

As described above, according to the projector 100 of the present embodiment, the zoom ratio of the projection optical system 150 can be measured with good accuracy using one measurement point projected on the projection screen SC. Further, since the keystone correction is executed on the projection image using the zoom ratio thus measured, the reproducibility of the original image by the projector 100 can be enhanced.

Incidentally, in the projector 100, it is also possible to add a zoom ratio detection section for specifying the zoom ratio by detecting the position of the zoom lens 152 of the projection optical system 150. However, by adopting the present embodiment of the invention, the zoom ratio of the projection optical system 150 can be measured without providing the zoom ratio detection section, and since the zoom ratio detection section can be eliminated, the projector 100 can be downsized and reduced in weight accordingly. Further, in the projector 100 according to the present embodiment, an active stereo method capable of performing the triangulation with at least one image capturing section 180 is adopted. Therefore, the projector 100 can further be downsized and reduced in weight compared to the projectors adopting a passive stereo method executed using two or more cameras as the image capturing section.

B. Modified Examples

It should be noted that the invention is not limited to the specific examples and the embodiments described above, but can be put into practice in various forms within the scope or the spirit of the invention, and the following modifications, for example, are also possible.

B1. First Modified Example

In the embodiments described above, it is possible to replace a part of the configuration realized by hardware with software, or to replace a part of the configuration realized by software with hardware. For example, it is also possible to arrange that the image processor 134 executes a part or the entire function of each of the constituents 121 through 125 included in the CPU 120.

B2. Second Modified Example

Although in the embodiments described above the measuring pattern image MI contains 9 measurement points MP1 through MP9 aligned in the 3×3 matrix, the measuring pattern image MI can be provided with other configurations. For example, the number of measurement points can be arranged to be smaller than 9, or larger than 9. It should be noted that in order for executing the triangulation, it is preferable to provide at least two measurement points in addition to the zoom ratio measurement point MP4, and the larger the number of measurement points is, the further the measurement accuracy of the triangulation can be enhanced. Further, the image for representing the measurement point is not limited to a dot, but it is also possible to arrange that the pattern detection section 121 detects a specific point on a straight line such as an intersection between straight lines as a measurement point. It should be noted that in order for improving the accuracy of the triangulation, the more distantly the measurement points are located the better.

Further, in the embodiment described above, although the zoom ratio of the projection optical system 150 is measured using the single zoom ratio measurement point MP4, it is also possible to arrange that a plurality of measurement points is used for the measurement of the zoom ratio. Thus, the measurement accuracy of the zoom ratio can be improved.

Incidentally, as shown in FIG. 6A, it is preferable that an offset is provided between the position of the panel optical axis intersection OPp on the panel surface 130s of the liquid crystal panel 130 and the position of the zoom ratio measurement point MP4. The reason therefor is that if the position of the panel optical axis intersection OPp and the position of the zoom ratio measurement point MP4 are identical to each other, it becomes difficult to detect the variation in the projection position of the zoom ratio measurement point MP4 corresponding to the variation of the zoom ratio. Further, the larger the distance between the panel optical axis intersection OPp and the zoom ratio measurement point MP4 is, the larger the variation in the projection position of the zoom ratio measurement point MP4 corresponding to the variation in the zoom ratio of the projection optical system 150 becomes, which is preferable because the measurement accuracy of the zoom ratio is improved.

Further, although in the embodiment described above, the angle formed between the direction vector of the optical axis offset direction and the direction vector of the optical axis OAi of the image capturing section 180 is substantially right-angle, the angle can be different therefrom. Even in such a configuration, the zoom ratio of the projection optical system 150 can be measured. It should be noted that in this case the moving direction of the zoom ratio measurement point SMP4 on the captured image SI due to the variation of the zoom ratio is not perpendicular to the moving direction due to the variation of the projection distance. Therefore, in order for improving the measurement accuracy of the zoom ratio of the projection optical system 150, the configuration of the embodiment described above is preferable.

B3. Third Modified Example

In the embodiment described above, the zoom ratio measurement section 122 determines the zoom ratio of the projection optical system 150 using the map having the coordinates of the zoom ratio measurement point MP4 in the captured image SI and the zoom ratio of the projection optical system 150 corresponding uniquely to each other. However, it is possible for the zoom ratio measurement section 122 not to use the map, but to use the correspondence between the position information of the zoom ratio measurement point MP4 and the zoom ratio of the projection optical system 150 prepared previously for determining the zoom ratio of the projection optical system 150. For example, the zoom ratio measurement section 122 can be arranged to calculate the zoom ratio of the projection optical system 150 along the formula capable of calculating the zoom ratio of the projection optical system 150 using the coordinates of the zoom ratio measurement point MP4.

B4. Fourth Modified Example

In the embodiment described above, the zoom ratio measurement point MP4 is detected using the captured image SI of the image capturing section 180, and then the coordinates in the image plane of the captured image SI are detected as the position information of the zoom ratio measurement point MP4. However, the zoom ratio measurement point MP4 can also be arranged that the position information thereof is detected by a different method. For example, it is also possible to arrange that the projection image of the zoom ratio measurement point MP4 is detected by an optical sensor such as an area sensor instead of using the image capturing section 180, and then the position information thereof is obtained.

Here, in the present specification, the "position information of the zoom ratio measurement point MP4" means the information capable of directly or indirectly specifying the position of the zoom ratio measurement point MP4. Therefore, the position information of the zoom ratio measurement point MP4 includes, for example, the coordinates u, v of the zoom ratio measurement point MP4 in the image plane of the captured image SI described above. Further, the position information of the zoom ratio measurement point MP4 includes the coordinates of the zoom ratio measurement point MP4 projected and displayed on the projection screen SC in the three-dimensional coordinate space.

B5. Fifth Modified Example

In the embodiment described above, the position of the image capturing section 180 is fixed to a single place with respect to the position of the projection optical system 150. However, the image capturing section 180 is not necessarily required to be fixed to the single place, but can be arranged to be movable to a plurality of relative locations with respect to the projection optical system 150. It should be noted that in this case it is preferable that the correspondence between the position information of the zoom ratio measurement point MP4 and the zoom ratio of the projection optical system 150 for measuring the zoom ratio is previously prepared for each of the locations of the image capturing section 180.

B6. Sixth Modified Example

In the embodiment described above, the configuration state of the projection screen SC is measured by triangulation using the zoom ratio of the projection optical system 150 thus measured, and then the keystone correction for the original image corresponding to the configuration state is executed. However, the projector 100 can also be arranged to execute other processes than the keystone correction using the zoom ratio thus measured. For example, it is also possible to arrange that the image distortion correction to be executed on the original image in the image projection onto a projection surface having a curvature is executed using the zoom ratio thus measured. Further, it is also possible to arrange that an automatic focus process for adjusting the focus of the projection image is executed.

B7. Seventh Modified Example

In the embodiment described above, the projector 100 having the projection optical system 150 provided with the zoom mechanism executes the measurement of the zoom ratio of the projection optical system 150. However, the method of measuring the zoom ratio explained in the embodiment described above can be applied not only to the projectors, but also to apparatuses and systems provided with the projection optical system for projecting light on the projection surface while zooming the light. For example, it is also possible to arrange that the invention is applied to a three-dimensional object recognition apparatus for projecting image light on the surface of the object to measure the shape of the object.

B8. Eighth Modified Example

In the embodiment described above, the transmissive liquid crystal panel is used as the light modulation element. However, it is possible for the projector 100 to use the light modulation element other than the transmissive liquid crystal panel. For example, it is also possible to adopt a reflective liquid crystal panel, digital light processing (DLP) (a registered trademark), and so on as the light modulation element.

The entire disclosure of Japanese Patent Application No. 2008-293212, filed Nov. 17, 2008 is expressly incorporated by reference herein.

What is claimed is:

1. A method of measuring a zoom ratio of a projection optical system adapted to project image light representing an original image on a projection screen, the method comprising:
   (a) projecting and displaying a measuring image including a measurement point on the projection screen so that the measurement point is displayed at a position with an offset from an optical axis of the projection optical system;
   (b) capturing a portion of the measuring image that contains a projected measurement point, which is the measurement point projected and displayed on the projection screen, from a measurement point detection position having a fixed position relative to the projection optical system;
   (c) detecting the projected measurement point based on the portion of the measuring image that is captured at the measurement point detection position; and
   (d) determining the zoom ratio using position information of the detected projected measurement point and a predetermined correspondence between the position information and the zoom ratio.

2. The method according to claim 1, wherein
   a direction vector of an optical axis of the image capturing section and a direction vector having a direction in which the measurement point has an offset from an optical axis of the projection optical system in the original image of the measuring image are substantially perpendicular to each other.

3. The method according to claim 2, wherein
   the position information includes coordinates of the image of the projected measurement point on the captured image, and
   step (d) includes
   (d1) determining the zoom ratio corresponding to the coordinates of the image using the coordinates of the image and the predetermined correspondence between the coordinates of the image and the zoom ratio.

4. A method of correcting an image for correcting a projection image displayed by projecting image light representing an original image on a projection screen via a projection optical system provided with a zoom mechanism, the method comprising:

(a) projecting and displaying a measuring image including a measurement point on the projection screen so that the measurement point is displayed at a position with an offset from an optical axis of the projection optical system;
(b) capturing at least a portion of the measuring image that contains a projected measurement point, which is the measurement point projected and displayed on the projection screen, from a measurement point detection position having a fixed position relative to the projection optical system;
(c) detecting the projected measurement point based on the portion of the measuring image that is captured at the measurement point detection position;
(d) determining the zoom ratio using position information of the detected projected measurement point and a predetermined correspondence between the position information and the zoom ratio; and
(e) correcting keystone distortion of the projection image using the determined zoom ratio.

5. The method according to claim 4, wherein
a direction vector of an optical axis of the image capturing section and a direction vector having a direction in which the measurement point has an offset from an optical axis of the projection optical system in the original image of the measuring image are substantially perpendicular to each other.

6. The method according to claim 5, wherein
the position information includes coordinates of the image of the projected measurement point on the captured image, and
step (d) includes
(d1) determining the zoom ratio corresponding to the coordinates of the image using the coordinates of the image and the predetermined correspondence between the coordinates of the image and the zoom ratio.

7. A projector adapted to display a projection image by projecting image light representing an original image on a projection screen, comprising:
a projection optical system provided with a zoom mechanism, and adapted to project the image light on the projection screen;
a measurement point detection section adapted to detect a projected measurement point included in a measuring image projected from the projection optical system to the projection screen, wherein the measurement point detection section includes an image capturing section adapted to capture an image of the projected measuring point of the measuring image, and detects the projected measurement point based on the image of the projected measuring point captured by the image capturing section; and
a control section adapted to execute a correction of the projection image,
wherein the projected measurement point includes a zoom ratio measuring projected measurement point projected and displayed at a position with an offset from an optical axis of the projection optical system,
the measurement point detection section is disposed at a measurement point detection position having a fixed relative position to the projection optical system, and
the control section obtains position information of the detected zoom ratio measuring projected measurement point, determines the zoom ratio using a predetermined correspondence between the position information and a zoom ratio corresponding to the position information, and executes correction of the projection image using the zoom ratio determined.

8. The projector according to claim 7, wherein
a direction vector of an optical axis of the image capturing section and a direction vector having a direction in which the zoom ratio measuring projected measurement point has an offset from an optical axis of the projection optical system in the original image of the measuring image are substantially perpendicular to each other.

9. The projector according to claim 8, wherein
the position information includes coordinates of an image of the zoom ratio measuring projected measurement point on a captured image captured by the image capturing section, and
the control section determines the zoom ratio corresponding to the coordinates of the image using the coordinates of the image and the predetermined correspondence between the image and the zoom ratio.

* * * * *